United States Patent
Herbaut et al.

(10) Patent No.: US 9,657,640 B2
(45) Date of Patent: May 23, 2017

(54) SPLITTER NOSE WITH A SHEET THAT FORMS A SURFACE TO GUIDE THE FLOW AND ACTS AS A DE-ICING DUCT

(71) Applicant: Techspace Aero S.A., Herstal (Milmort) (BE)

(72) Inventors: Ghislain Herbaut, Berloz (BE); Benoît Baldewijns, Hannut (BE)

(73) Assignee: Safran Aero Boosters SA, Herstal (Milmort) (BE)

(*) Notice: Subject to any disclaimer, the term of this patent is extended or adjusted under 35 U.S.C. 154(b) by 301 days.

(21) Appl. No.: 14/323,886

(22) Filed: Jul. 3, 2014

(65) Prior Publication Data

US 2015/0007895 A1 Jan. 8, 2015

(30) Foreign Application Priority Data

Jul. 5, 2013 (EP) .................................. 13175411

(51) Int. Cl.
| | | |
|---|---|---|
| *F02C 7/047* | (2006.01) | |
| *F01D 25/02* | (2006.01) | |
| *B64D 33/02* | (2006.01) | |
| *F02C 6/08* | (2006.01) | |

(52) U.S. Cl.
CPC .............. *F02C 7/047* (2013.01); *F01D 25/02* (2013.01); *B64D 2033/0233* (2013.01); *B64D 2700/62052* (2013.01); *B64D 2700/62061* (2013.01); *B64D 2700/62087* (2013.01); *B64D 2700/62131* (2013.01); *F02C 6/08* (2013.01); *F05D 2260/208* (2013.01); *Y02T 50/672* (2013.01); *Y10T 137/0536* (2015.04)

(58) Field of Classification Search
CPC .. F02C 6/08; F02C 7/047; F01D 25/02; F05D 2260/208; B64D 2033/0233; B64D 700/62052; B64D 700/62061; B64D 700/62087; B64D 700/62131
See application file for complete search history.

(56) References Cited

U.S. PATENT DOCUMENTS

| | | | |
|---|---|---|---|
| 6,561,760 B2 | 5/2003 | Wadia | |
| 2010/0236213 A1* | 9/2010 | Schilling | ................. F01D 25/14 |
| | | | 60/39.08 |
| 2016/0097323 A1* | 4/2016 | Prather | ................... F01D 25/02 |
| | | | 415/178 |

FOREIGN PATENT DOCUMENTS

| | | |
|---|---|---|
| EP | 2075194 A1 | 7/2014 |
| GB | 2442967 A | 4/2008 |

OTHER PUBLICATIONS

European Search Report dated Aug. 13, 2013 for EP 13175411.1.

* cited by examiner

*Primary Examiner* — Gerald L Sung
*Assistant Examiner* — Scott Walthour
(74) *Attorney, Agent, or Firm* — James E. Walton

(57) ABSTRACT

The present application relates to a splitter nose of an axial turbomachine configured to separate an annular flow into the turbomachine into a primary flow and a secondary flow, and including: a generally circular leading edge, an annular wall extending from the leading edge and bounding the secondary flow, and at least one duct for a de-icing fluid for the splitter nose extending substantially axially along the wall and opening out into the primary flow. The external surface of the wall is formed by a sheet bounding the de-icing duct.

16 Claims, 4 Drawing Sheets

SPLITTER NOSE WITH A SHEET THAT FORMS A SURFACE TO GUIDE THE FLOW AND ACTS AS A DE-ICING DUCT

This application claims priority under 35 U.S.C. §119 to European Patent Application No. 13175411.1, filed 5 Jul. 2013, titled "Splitter Nose with a Sheet That Forms a Surface to Guide the Flow and Acts as a De-Icing Duct," which is incorporated herein by reference for all purposes.

BACKGROUND

1. Field of the Application

The present application relates to double-flow axial turbomachines. More specifically, the present application relates to the splitter nose of a double-flow axial turbomachine, the nose splitting the incoming airflow into a primary and a secondary flow. More precisely, the present application relates to a splitter nose of an axial turbomachine provided with a de-icing system.

2. Description of Related Art

In order to optimize their thrust, turbojet engines work with several annular airflows. A primary flow passes through a compressor, a combustion chamber, and is then expanded in a turbine. A secondary flow bypasses the outside of the compressor, the combustion chamber and the turbine, and then rejoins the main flow at the outlet of the turbojet. The flows are separated by a splitter nose positioned upstream of the compressor. The shape of the nose enables the airstream entering the turbomachine to be divided and restricts entry into the compressor. Since it is located downstream of the fan blades, it is susceptible to the ingestion of foreign objects.

A splitter nose of an axial turbomachine generally comprises an external annular wall and an external stator shell. These elements comprise the guidance surfaces of the annular streams from the leading edge of the splitter nose. The geometric accuracy and the relative positioning of the guidance surfaces are guarantors of the aerodynamic stream as defined.

The relative positioning between the guidance surfaces depends on the concentricity between the annular wall and the external shell. To obtain the concentricity, it is recognised that a means of centring needs to be provided between the external shell and the annular wall. The means of centring enables the primary flow separated by the annular wall to be centred on the compressor. This promotes uniform entry of the primary flow into the low-pressure compressor and avoids vibrations being generated.

The air entering the turbomachine remains at atmospheric temperature at the splitter nose. At altitude these temperatures can drop to −50° C. In the presence of moisture, ice may form on the nose. In flight, this ice can expand and accumulate to form blocks at the tops of the compressor stator blades.

These blocks may change the geometry of the nose and influence the flow of air entering the compressor, which can reduce its efficiency. As they develop, these blocks can become very heavy. Thereafter, they may break off and be ingested by the compressor, which could damage the rotor and stator blades as they pass through.

To limit this ice formation, splitter noses are fitted with de-icers.

U.S. Pat. No. 6,561,760 B2 discloses a splitter nose for the axial compressor of a turbomachine, the nose having a de-icing system using exhaust gas. The nose is formed with an external wall and an external shell. This latter supports an annular row of stator blades. The splitter nose comprises a circular slot into which engages with an upstream edge of the external shell. The edge of the slit is machined so as to provide axial ducts in the thickness of the elements. These ducts enable the exhaust gas to circulate, which has the effect of heating the leading edge of the splitter nose. The latter is thus well protected against ice formation. However, this type of nose requires both precise and accurate machining to carry the ducts. The manufacturing costs are therefore high. Furthermore, the external wall has a solid profile that reduces thermal conduction. The external surfaces of these massive areas are thus less well de-iced. In particular, the leading edge which is in contact with a large airflow is not de-iced as effectively as the axially external surface of the annular row of blades.

Although great strides have been made in the area of splitter noses for axial turbomachines, many shortcomings remain.

DETAILED DESCRIPTION OF THE PREFERRED EMBODIMENT

Figure 1:
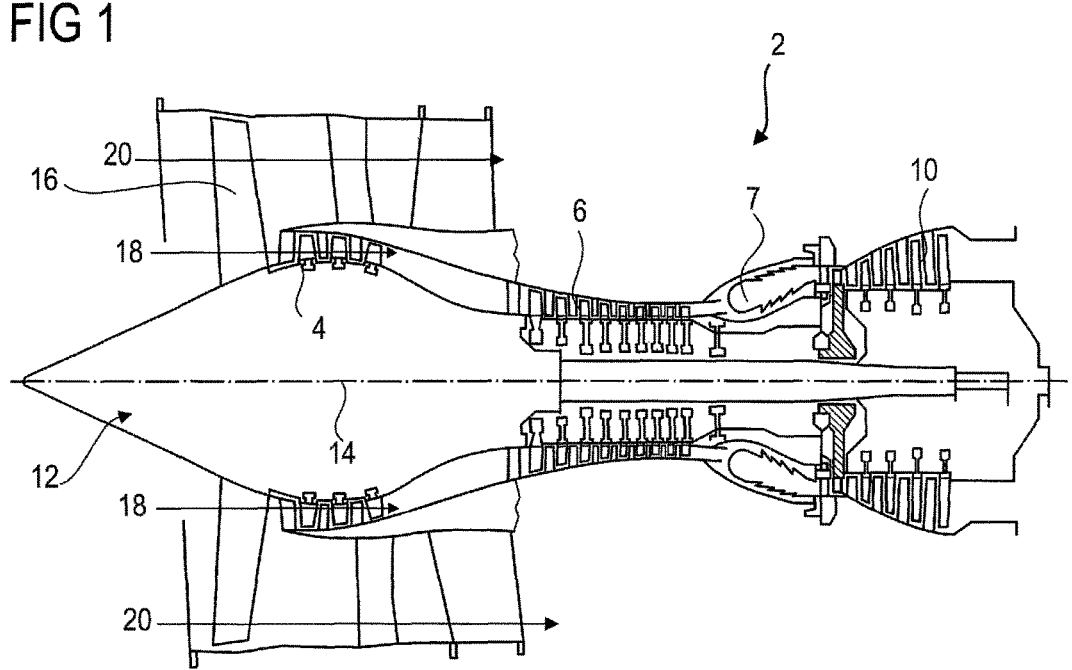
FIG. 1 shows an axial turbomachine in accordance with the present application.

The present application aims to solve at least one of the problems presented by the prior art. The present application also aims to increase the homogeneity of the effectiveness of a de-icing nose on an axial turbomachine. More specifically, the present application aims to increase the effectiveness of a de-icing nose at its leading edge.

The present application relates to a splitter nose of an axial turbomachine designed to separate an annular flow into the turbomachine into a primary flow and a secondary flow, and comprising: a generally circular leading edge; an annular wall extending from the leading edge and defining the secondary flow; at least one duct for de-icing fluid for a splitter nose, extending substantially axially along the wall opening into the primary flow; wherein the external surface of the wall is formed by a sheet bounding the de-icing duct.

According to an advantageous embodiment of the present application, the duct(s) has/have a substantially constant thickness over most of its/their extent axially along the wall.

According to an advantageous embodiment of the present application, the sheet is an annular sheet or a plurality of annular sheets, and has a profile with a substantially straight downstream portion and a curved upstream portion which forms the leading edge.

According to an advantageous embodiment of the present application, the sheet has a thickness less than 1.50 mm, preferably less than 1.00 mm, more preferably less than 0.50 mm.

According to an advantageous embodiment of the present application, the de-icing duct extends radially over the majority of the surface of revolution of the annular sheet.

According to an advantageous embodiment of the present application, the annular wall comprises a sheet support, whose external surface has a step in it for a downstream edge of the sheet, so that the outside surface of the sheet is level with that of the support at the said step.

According to an advantageous embodiment of the present application, the annular wall forms an annular hook at the leading edge, preferably with an annular groove open axially downstream.

According to an advantageous embodiment of the present application, the nose comprises an external shell of a bladed stator, the upstream edge of the said shell comprising an annular centring surface mating with a corresponding centring surface on the wall designed to ensure concentricity between the said wall and the said shell.

According to an advantageous embodiment of the present application, the external shell comprises an annular groove designed to house an annular layer of abradable material.

According to an advantageous embodiment of the present application, both the external shell and the annular wall comprise, downstream of the centring surfaces, a radially extending flange, the said flanges being fixed to each other and overlapping axially and/or radially.

According to an advantageous embodiment of the present application, the nose comprises at least one de-icing fluid supply conduit, in communication with the de-icing duct and preferably crossing the two annular flanges.

According to an advantageous embodiment of the present application, the nose comprises several de-icing ducts which extend axially and which are distributed along the periphery of the annular wall.

According to an advantageous embodiment of the present application, the de-icing ducts are formed by the sheet and the support of the said sheet, the support preferably having on its external surface cavities distributed along its circumference and corresponding to the ducts.

According to an advantageous embodiment of the present application, the nose comprises a plenum chamber, preferably annular, for distributing the fluid to the de-icing ducts, the chamber preferably being connected to the ducts by passageways through the support.

According to an advantageous embodiment of the present application, the or each of the ducts comprises an output in the form of an annular slot, possibly segmented, pointing radially inward and axially downstream.

According to an advantageous embodiment of the present application, the annular wall comprises at least one passageway in communication with the de-icing duct of the annular wall.

According to an advantageous embodiment of the present application, the sheet is a first annular sheet, the annular wall comprising a second annular sheet which fits inside the first sheet, the de-icing duct being bounded by the first sheet and the second sheet.

According to an advantageous embodiment of the present application, the nose comprises walls extending substantially axially between the first and second sheets to form a plurality of de-icing ducts.

The present application also relates to an axial turbomachine comprising a splitter nose, wherein the splitter nose is in accordance with the present application, preferably the turbomachine comprises a compressor having a first annular row of stator blades at the compressor inlet and supported by the splitter nose.

The present application allows the splitter nose to be de-iced uniformly. The leading edge also receives heat that has only to cross the thickness of the annular sheet. This thickness may be carefully chosen to facilitate thermal conduction. The annular sheet also has a constant thickness, which further improves the uniformity of the de-icing.

This solution allows the use of elements already certified for use in a turbomachine. Therefore, the present application limits the number of components needing be certified so that they can be fitted in a turbomachine in a civil aircraft.

In the following description, the terms inner or internal and outer or external refer to a position relative to the axis of rotation of an axial turbomachine.

FIG. 1 shows a schematic view of an axial turbomachine. In this case it is a double-flow turbojet. The turbojet 2 comprises a first compression stage, a so-called low-pressure compressor 4, a second compression stage, a so-called high-pressure compressor 6, a combustion chamber 7 and one or more turbine stages 10. In operation, the mechanical power of the turbine 10 is transmitted through the central shaft to the rotor 12 and drives the two compressors 4 and 6. Reduction mechanisms may increase the speed of rotation transmitted to the compressors. Alternatively, the different turbine stages can each be in communication with the compressor stages through concentric shafts. These latter comprise several rotor blade rows associated with stator blade rows. The rotation of the rotor around its axis of rotation 14 generates a flow of air and gradually compresses it up to the inlet of the combustion chamber 7.

An inlet fan, commonly designated a fan 16, is coupled to the rotor 12 and generates an airflow which is divided into a primary flow 18 passing through the various above-mentioned stages of the turbomachine, and a secondary flow 20 passing through an annular conduit (shown in part) along the length of the machine and then rejoins the main flow at the turbine outlet. The primary flow 18 and secondary flow 20 are annular flows and are ducted through the housing of the turbomachine. For this purpose, the housing has cylindrical walls or shells which may be internal and external depending on their position relative to the fluid stream which they bound.

Figure 2:
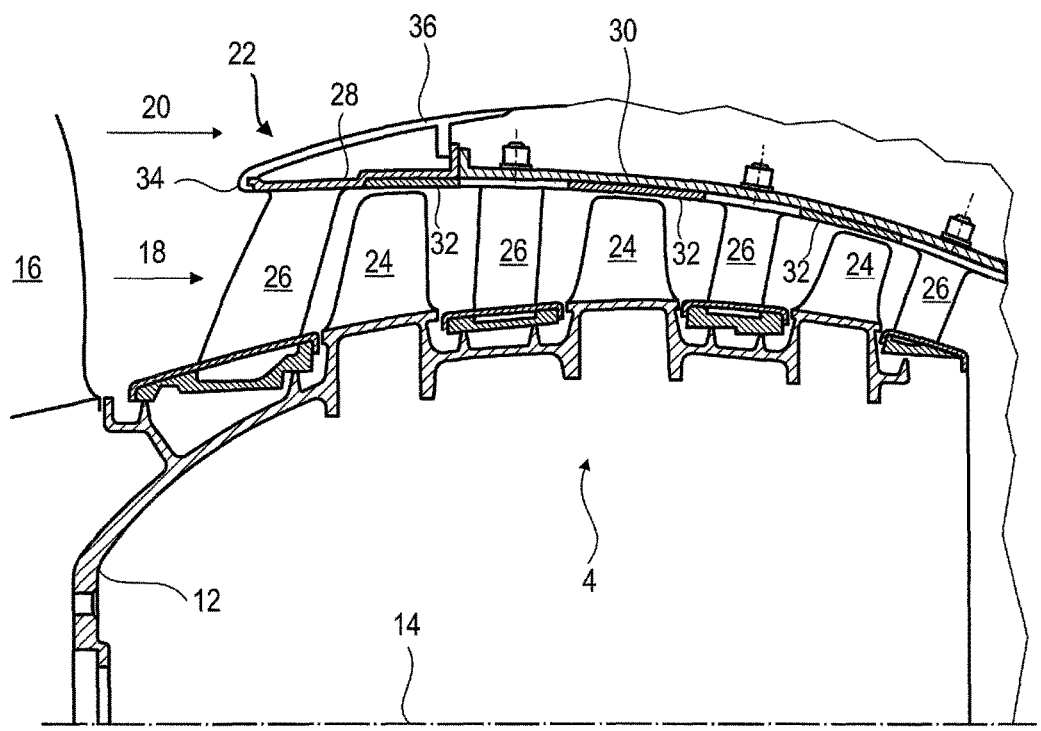
FIG. 2 shows a diagram of a turbomachine compressor according to the present application.

FIG. 2 is a sectional view of a compressor of an axial turbomachine such as that in FIG. 1. The compressor may be a low-pressure compressor 4 (FIG. 1). Shown are a portion of the fan 16 and the splitter nose 22 for the primary flow 18 and the secondary flow 20. The rotor 12 comprises several rows of rotor blades 24, in this case three.

The low-pressure compressor 4 comprises several stators, in this case four, each containing a row of stator blades 26. Stators are associated with the fan 16 or a row of rotor blades for straightening the airflow so as to convert the velocity of the stream into pressure.

The stator blades 26 extend substantially radially from an external casing, and can be fixed there with a pin. They are equidistant from each other, and have the same angular orientation to the airflow. Advantageously, the blades of one row are identical. Optionally, the spacing between the blades can vary locally as can their angular orientation. Some blades may be different from the rest of the blades in their row.

The splitter nose 22 comprises a leading edge 34 whose diameter determines the primary flow that can enter the compressor 4. The splitter nose 22 also comprises an external shell 28 which bounds the outside of the primary flow 18, and an annular wall 36 which defines and/or bounds the inside of the secondary flow 20. As an extension to the external shell 28, the nose comprises an external housing 30 extending axially along the compressor. The shell 28 and the external housing 30 comprise annular layers 32 of abradable material. They each provide a seal with the tips of the rotor blades 24 with which they mate by abrasion.

Figure 3:
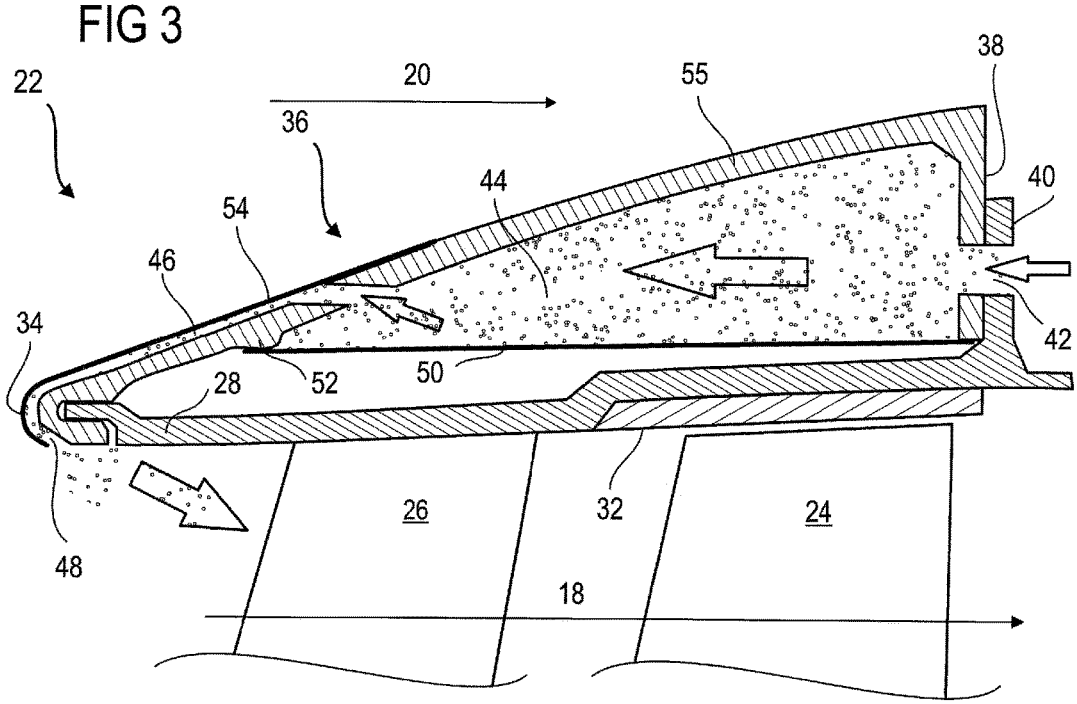
FIG. 3 illustrates a splitter nose according to a first embodiment of the present application.

FIG. 3 illustrates a splitter nose 22 according to a first embodiment of the present application.

The annular wall 36 and the external shell 28 comprise annular flanges 38 and 40 which extend radially towards each other and which may overlap axially and/or radially. These flanges 38 and 40 are fixed to one another. The flanges 38 and 40 may comprise means for positioning and/or orientation. The flanges are arranged downstream of the leading edge 34 and of the de-icing duct(s) and/or the plenum chamber which will be described hereinafter.

The splitter nose 22 comprises a de-icing system, designed to prevent the formation of ice and/or melting ice that has already formed. The de-icing system is intended to carry a hot fluid to de-ice the splitter nose and, optionally, upstream surfaces such as those of the stator blades 26. The hot fluid may comprise exhaust gases from the turbine. It may also be from a compressor. The de-icing system comprises, in sequence, an inlet manifold 42, a plenum chamber 44, a de-icing duct 46, and an outlet 48, all of which are in communication.

The inlet manifold 42 is formed in the annular flanges 38 and 40. The manifold 42 passes axially through the two annular flanges 38 and 40. The plenum chamber 44 is preferably annular. It is bounded axially by the annular flange 38 and radially by the inner surface of the annular wall 36 and by a connected annular shell 50. The annular shell 50 may be fixed downstream of the annular flange 38, and upstream on a ridge 52 formed on the annular wall 36. The annular shell 50 enables the plenum chamber 44 of the external shell 28 to be separate, especially thermally.

The outlet 48 of the duct 46 is located axially at the upstream edge of the annular wall 36. It is located axially upstream from the external shell 28, preferably remotely. It forms a slot, preferably annular and possibly segmented. It is oriented inwards and/or pointing downstream.

Upstream of the plenum chamber 44, the de-icing duct 46 is bounded between a support wall 55 and an annular sheet 54. The duct 46 extends mainly axially. It may also extend partially radially relative to its inclination.

Figure 4:
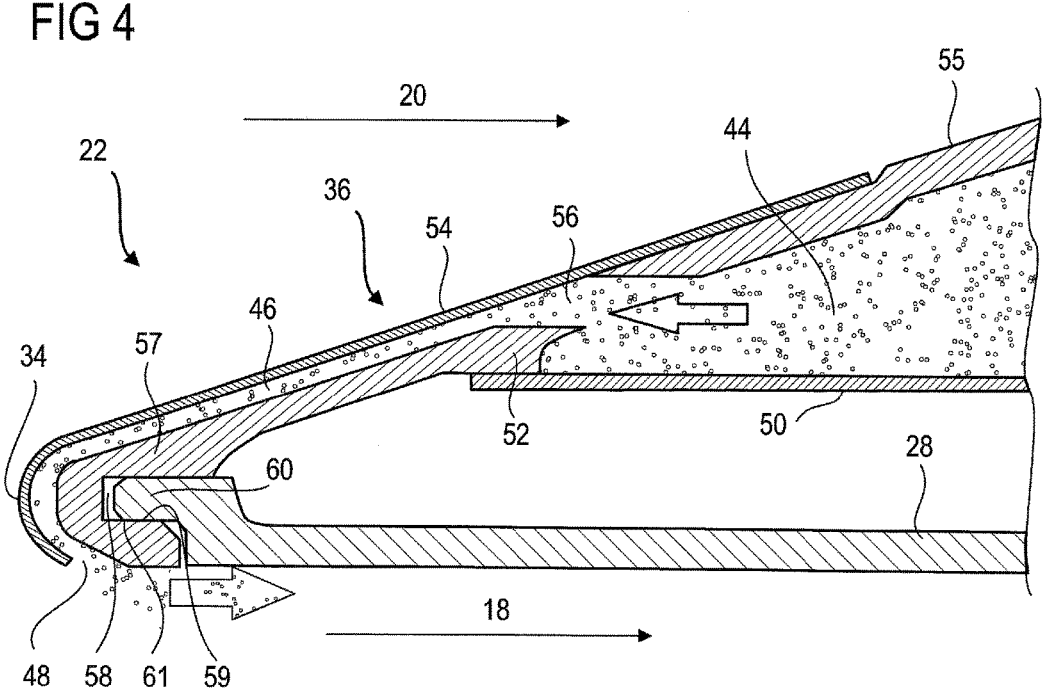
FIG. 4 is a detailed view of the upstream part of the splitter nose of FIG. 3.

FIG. 4 is a more detailed view of the upstream part of the splitter nose 22 of FIG. 3.

The annular sheet 54 is located on the upstream side of the support wall 55. The annular sheet 54 extends from the leading edge 34 inwards into the primary flow 18, and outwards into the secondary flow 20.

The annular sheet 54 comprises a surface of revolution about the axis of the splitter nose 22, said axis corresponding to the axis of rotation of the machine. The profile is hook-shaped upstream and has a substantially straight part downstream. The de-icing duct 46 communicates with the plenum chamber 44 via an opening or passageway 56 through the annular wall 36.

The annular wall 36 has a surface of revolution with a solid of revolution 57. The de-icing duct 46 extends to the joint between the annular sheet 54 and the support wall 55. The de-icing duct 46 is formed, preferably locally, in a circumferential direction, in the thickness of the solid of revolution 57. The present application exploits the strength provided by the solid of revolution 57 by including a duct in it. This latter reduces the strength of the annular wall 36 only slightly and locally.

The support wall 55 and the external shell 28 comprise means of positioning. The means of positioning comprise means of centring, preferably located upstream. The means of centring of the annular wall 36 and the external shell 28 comprise concentric centring surfaces which mate together to ensure concentricity between the annular wall 36 and the external shell 28.

The support wall 55 comprises an annular groove 58 which is open axially downstream. The groove 58 is formed in the thickness of the support wall. The annular wall 36 comprises a first means of centring such as a first centring surface 59 which may be formed in the annular groove 58. The external shell 28 comprises a tubular seating 60, fitted in the annular groove 58. The external shell 28 comprises complementary means of centring, such as a second centring surface 61, for example formed on the tubular seating 60. The first surface 59 and the second surface 61 are matched, are fixed to each other and are mechanically adjusted.

The centring surfaces are machined by turning and are preferably ground. They may be cylindrical. The means of centring are in direct contact for greater accuracy. They ensure a concentricity of less than 0.50 mm in diameter, more preferably less than 0.20 mm, more preferably less than 0.07 mm.

The means of centring have axial clearance. Since the external shell 28 and the annular wall 36 are also attached downstream, this axial clearance is required to allow differential expansion. They are exposed to different temperatures and may also be made of different materials. The external shell 28 may be made of aluminium and the annular wall 36 of titanium, or vice versa. One of them may be made of a composite material.

Figure 5:
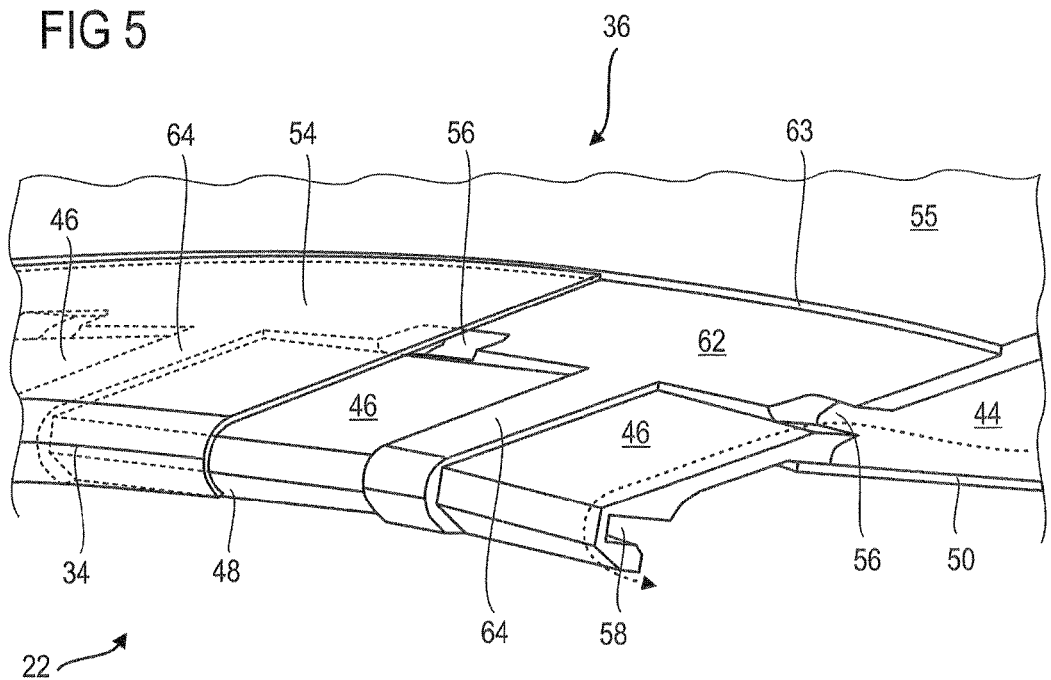
FIG. 5 is an isometric view of the splitter nose shown in FIGS. 3 and 4.

FIG. 5 is an isometric view of the splitter nose 22 shown in FIGS. 3 and 4.

Preferably, the splitter nose comprises several de-icing ducts 46 which are distributed over its circumference. The annular sheet 54 extends axially downstream of the de-icing ducts 46 and mates with an annular attachment zone 62. This is formed in the thickness of the annular wall 36 so as to enable the external surfaces to have tangency. The attachment zone 62 is bounded axially by an annular step or ledge 63 formed on the boundary surface of the annular wall. The height of the step 63 enables the annular sheet 54 to fit into the thickness of the annular wall 36.

The de-icing ducts 46 form cavities or dishes on the upstream side. They can be machined into the body of the support wall 55. The cavities are formed by zones of reduced thickness in the support wall 55. The de-icing ducts 46 are separated from each other by partitioning strips 64 forming a surface that is continuous with the attachment zone 62.

The de-icing ducts 46 are essentially wide. They extend over the majority of the circumference of the splitter nose 22, preferably over 80%. Each de-icing duct 46 extends across two adjacent blades of the same stator, preferably across more than five adjacent blades of the same stator. Each de-icing duct 46 may be wider than its axial length.

Figure 6:
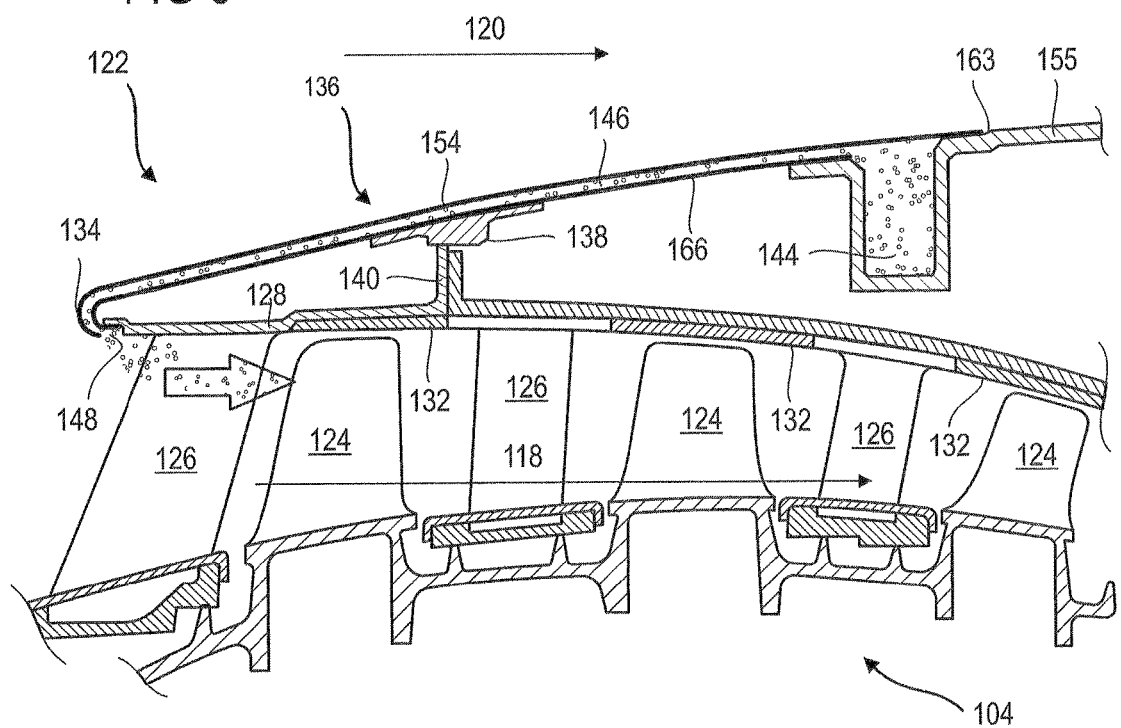
FIG. 6 illustrates an axial turbomachine with a splitter nose according to a second embodiment of the present application.

FIG. 6 illustrates a compressor comprising a splitter nose 122 according to a second embodiment of the present application. FIG. 6 has the same numbering scheme as in previous figures for the same or similar elements, but the numbering is incremented by 100. Specific numbers are used for items specific to this embodiment.

The annular sheet 154 is a first annular sheet 154. The annular wall 136 comprises a second annular sheet 166. The thickness of the second sheet 166 is greater than the thickness of the first sheet 154 by at least 20%, preferably by at least 70%, more preferably by at least 200%. The annular flange 138 of the annular wall 136 is attached to the second sheet 166 and engages the annular flange 140 of the external shell 128. The annular flange 138 comprises a large surface of revolution, enabling the second sheet 166 to be made more rigid.

The plenum chamber 144 is located axially in the downstream half of the compressor 104. The plenum chamber 144 is bounded by the first sheet 154 and the support 155 for the annular wall sheet 136, which has a part with a rectangular surface of revolution. This part has an axial extension on which the second sheet 166 is fixed.

The de-icing duct 146 extends axially over most of the compressor 104. It extends axially over at least about half of the annular rows of rotor blades 124 and/or half of the annular rows of stator blades 126.

Figure 7:
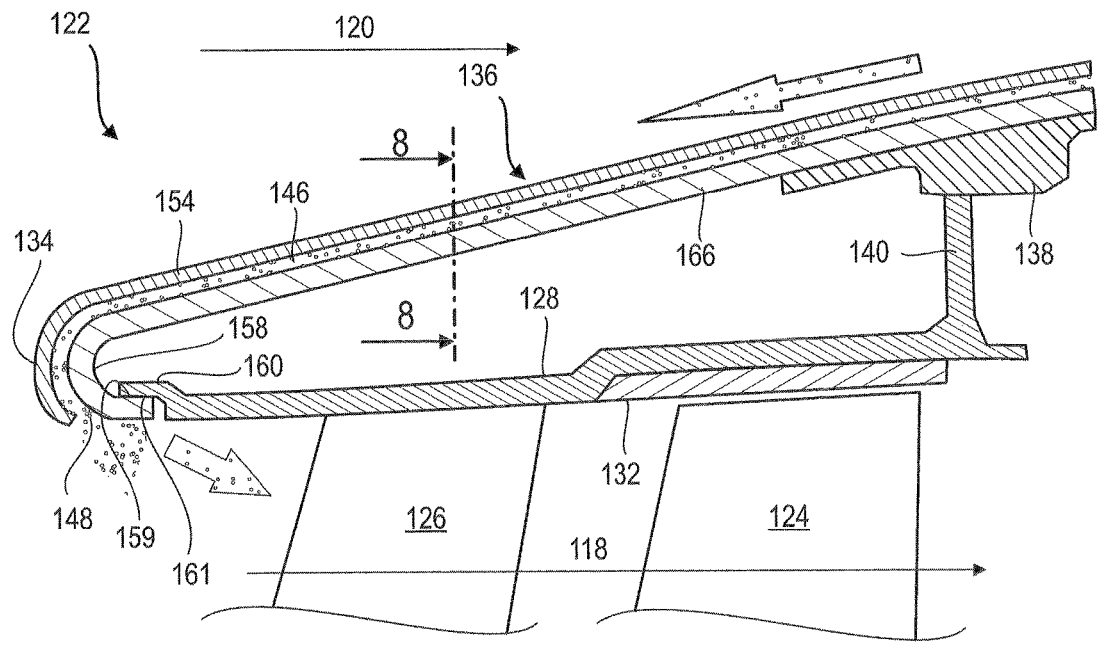
FIG. 7 shows the upstream portion of the splitter nose of FIG. 6.

FIG. 7 illustrates the upstream part of a splitter nose 122 according to a second embodiment of the present application.

The annular groove 158 of the annular wall 136 is formed on the second sheet 166. Its surface of revolution is substantially rounded and forms a hook. This shape can be achieved by bending the second sheet 166, thereby reducing manufacturing costs.

The annular flanges 138 and 140 mate with each other. They can be in contact over a cylindrical area. They may be attached to each other so as to support each other.

The second sheet 166 and the external shell 128 comprise means of centring. They each comprise a centring surface, the said centring surfaces mate so as to ensure centring between the second sheet 166 and the external shell 128. Centring surfaces can be machined by turning and optionally have a cylindrical shape.

Figure 8:
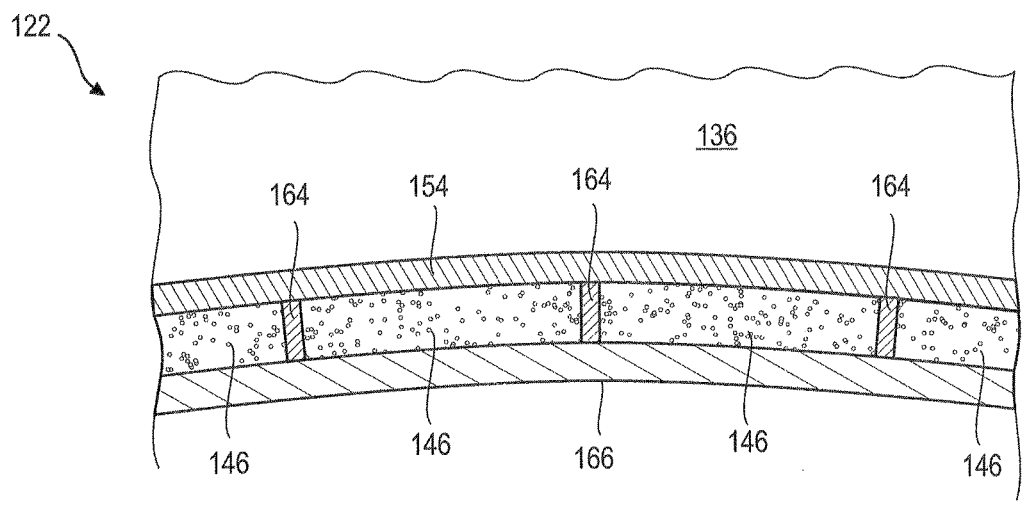
FIG. 8 shows a sectioned view of the splitter nose, sectioned along axis 8-8 shown in FIG. 7.

FIG. 8 is a sectional view, sectioned along 8-8 shown in FIG. 7, which shows the splitter nose 122 in accordance with the second embodiment of the present application.

The splitter nose 122 comprises partitioning strips 164 which extend radially. The partitioning strips 164 act as spacers for maintaining separation between the first sheet 154 and the second sheet 166. The partitioning strips 164 are connected and fixed to the second sheet 166, and, optionally, to the first. The axial partitions 164 are distributed over the circumference of the second sheet 166.

We claim:

1. A splitter nose of an axial turbomachine configured to separate a flow entering the axial turbomachine into a primary flow and a secondary flow, the splitter nose comprising:
    a generally circular leading edge;
    an outer annular wall extending from the generally circular leading edge and bounding the secondary flow said outer annular wall comprising a support wall and a constant thickness sheet attached to the support wall at an aft edge of the constant thickness sheet;
    an inner annular wall extending from the generally circular leading edge and bounding the primary flow, said inner annular wall connecting with said outer annular wall proximal to the generally circular leading edge;
    wherein the constant thickness sheet defines an outer boundary of at least one duct for a de-icing fluid for the splitter nose extending substantially axially along the outer annular wall and opening into the primary flow;
    wherein an inner boundary of the at least one duct is substantially parallel to the constant thickness sheet, the inner boundary of the at least one duct comprising one of the support wall or a second annular sheet; and
    wherein the generally circular leading edge of the splitter nose is formed by the constant thickness sheet.

2. A splitter nose of an axial turbomachine configured to separate a flow entering the axial turbomachine into a primary flow and a secondary flow, the splitter nose comprising:
    a generally circular leading edge;
    an outer annular wall extending from the generally circular leading edge and bounding the secondary flow, said outer annular wall comprising a support wall and a constant thickness sheet attached to the support wall at an aft edge of the constant thickness sheet;
    an inner annular wall extending from the generally circular leading edge and bounding the primary flow, said inner annular wall connecting with said outer annular wall proximal to the generally circular leading edge;
    wherein the constant thickness sheet defines an outer boundary of at least one duct for a de-icing fluid for the splitter nose, the at least one duct extending substantially axially along the outer annular wall and opening into the primary flow;
    wherein an inner boundary of the at least one duct is substantially parallel to the constant thickness sheet, the inner boundary of the at least one duct comprising one of the support wall or a second annular sheet; and
    wherein a portion of an external surface of the outer annular wall is formed by the constant thickness sheet.

3. The splitter nose in accordance with claim 1, wherein the at least one duct has a major part of a length along the annular wall and a substantially constant thickness over said major part of the length of the at least one duct.

4. The splitter nose in accordance with claim 1, wherein the constant thickness sheet is an annular sheet and has a profile with an aft portion that is substantially straight and a curved forward portion which forms the generally circular leading edge.

5. The splitter nose in accordance with claim 1, wherein the constant thickness sheet includes an exterior surface, wherein the support wall is the inner boundary of the at least one duct, and wherein
    the support wall comprises an exterior surface with a step facing the aft edge of the constant thickness sheet so that the exterior surface of the constant thickness sheet is level with the exterior surface of the support wall at the step.

6. The splitter nose in accordance with claim 1, wherein the outer annular wall forms an annular hook at the generally circular leading edge with an annular groove open axially aftward.

7. The splitter nose in accordance with claim 1, wherein the inner annular wall is an external shell of a bladed stator, and wherein the external shell includes a forward edge comprising:
    an annular centering surface mating with a corresponding centering surface on the outer annular wall configured to ensure concentricity between the outer annular wall and the external shell.

8. The splitter nose in accordance with claim 7, wherein both the external shell and the outer annular wall comprise:
    respective flanges extending radially, aft of the annular centering surface and the corresponding centering surface on the outer annular wall;
    the flange of the external shell and the flange of the outer annular wall being attached to each other and axially and/or radially overlapping each other.

9. The splitter nose in accordance with claim 1, further comprising: at least one manifold for supplying the de-icing fluid in communication with the at least one duct and through the flange of the external shell and through the flange of the outer annular wall.

10. The splitter nose in accordance with claim 1, wherein the at least one duct comprises a plurality of ducts which extend axially and which are distributed along a periphery of the outer annular wall.

11. The splitter nose in accordance with claim 10, wherein the plurality of ducts is formed by the constant thickness sheet and the support wall, the support wall comprising:
cavities distributed along a circumference of the support wall on an external surface of the support wall, the cavities corresponding to the plurality of ducts.

12. The splitter nose in accordance with claim 10, further comprising:
an annular plenum chamber configured to distribute the de-icing fluid to the plurality of ducts, the annular plenum chamber being connected to the plurality of ducts by passageways through the support wall.

13. The splitter nose in accordance with claim 1, wherein the at least one duct comprises:
an outlet formed as an annular gap, said annular gap being opened radially inward and pointing axially aftward.

14. The splitter nose in accordance with claim 1, wherein the constant thickness sheet is an annular sheet, and wherein the inner boundary of the at least one duct is the second annular sheet, the second annular sheet being configured to fit inside the first annular sheet.

15. The splitter nose in accordance with claim 14, further comprising:
partitioning strips extending substantially axially between the constant thickness sheet and the second annular sheet so as to form a plurality of de-icing ducts including the at least one duct.

16. An axial turbomachine, comprising:
a compressor having an inlet and a first annular row of stator blades at the inlet; and
a splitter nose configured to separate a flow entering the axial turbomachine into a primary flow and a secondary flow, said splitter nose configured to support said first annular row of stator blades, wherein said splitter nose comprises:
a generally circular leading edge;
an external annular wall extending from the generally circular leading edge and bounding the secondary flow, said external annular wall comprising a support wall and a constant thickness sheet attached to the support wall at an aft edge of the constant thickness sheet;
an internal annular wall extending from the generally circular leading edge and bounding the primary flow, said internal annular wall connecting with said external annular wall proximal to the generally circular leading edge;
wherein the constant thickness sheet defines an outer boundary of at least one duct for a de-icing fluid for the splitter nose, the at least one duct extending substantially axially along the external annular wall and opening into the primary flow;
wherein an inner boundary of the at least one duct is substantially parallel to the constant thickness sheet, the inner boundary of the at least one duct comprising one of the support wall or a second annular sheet; and
wherein a portion of an external surface of the external annular wall is formed by the constant thickness sheet.

* * * * *